(12) United States Patent
Miyatake et al.

(10) Patent No.: US 7,156,530 B2
(45) Date of Patent: *Jan. 2, 2007

(54) ANTIREFLECTION FILM, OPTICAL ELEMENT AND VISUAL DISPLAY

(75) Inventors: Minoru Miyatake, Ibaraki (JP); Tomoaki Masuda, Ibaraki (JP); Takayuki Shigematsu, Ibaraki (JP); Masahiro Yoshioka, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 315 days.

This patent is subject to a terminal disclaimer.

(21) Appl. No.: 10/775,074

(22) Filed: Feb. 11, 2004

(65) Prior Publication Data

US 2004/0157065 A1    Aug. 12, 2004

Related U.S. Application Data

(63) Continuation of application No. 10/271,528, filed on Oct. 17, 2002, now Pat. No. 6,773,121.

(30) Foreign Application Priority Data

Oct. 18, 2001 (JP) .............................. 2001-320569
Sep. 13, 2002 (JP) .............................. 2002-268043

(51) Int. Cl.
*G02B 27/00* (2006.01)

(52) U.S. Cl. ...................... 359/614; 428/141; 428/142; 428/149; 428/145; 428/447; 428/500; 528/34; 528/42

(58) Field of Classification Search ..................... None
See application file for complete search history.

(56) References Cited

U.S. PATENT DOCUMENTS

| 5,800,926 A | * | 9/1998 | Nogami et al. | ............ | 428/447 |
| 6,403,225 B1 | * | 6/2002 | Narisawa et al. | ........... | 428/429 |
| 6,558,804 B1 | | 5/2003 | Sato et al. | .................. | 428/447 |
| 2003/0077457 A1 | * | 4/2003 | Akamatsu et al. | ......... | 428/429 |

FOREIGN PATENT DOCUMENTS

JP          9-208898          8/1997

* cited by examiner

*Primary Examiner*—Marc S. Zimmer
(74) *Attorney, Agent, or Firm*—Westerman, Hattori, Daniels & Adrian LLP

(57) ABSTRACT

An antireflection film having a hard coat layer prepared on one side of a transparent substrate directly or through other layers, and further an antireflection layer laminated on a surface of the hard coat layer, wherein the antireflection layer is formed by a dry cured film obtained from a solution comprising a siloxane oligomer (A) obtained by condensation polymerization after partial hydrolysis of a hydrolyzable alkoxy silane that contains a tetra alkoxy silane represented by a general formula (1): $Si(OR)_4$ (where R represents methyl group or ethyl group) as a principal component and a compound (B) having a fluoro alkyl structure and a polysiloxane structure, is excellent scratch-proof property, stain resistance, and cured in a short period of time at comparatively low temperature.

22 Claims, 1 Drawing Sheet

ANTIREFLECTION FILM, OPTICAL ELEMENT AND VISUAL DISPLAY

The present application is a continuation of application Ser. No. 10/271,528 filed on Oct. 17, 2002 now U.S. Pat. No. 6,773,121, which is hereby incorporated by reference.

BACKGROUND OF THE INVENTION

1. Field of the Invention

The present invention relates to an antireflection film used in order to suppress decrease of the screen visibility of a visual display, such as in liquid crystal displays (LCD), organic EL displays and PDP, and to an optical element having the antireflection film concerned prepared thereto. Moreover, the present invention also relates to a visual display with the antireflection film or the optical element concerned provided thereto. Furthermore, it relates to an antireflection layer forming agent, and an antireflection layer formed by the antireflection layer forming agent.

2. Description of the Prior Art

Research and development in recent years, a liquid crystal panel device is ensuring steadfast status as a display. However, in monitors for car navigation system and in monitors for video cameras, which is used with high frequency in brightly illuminated environment, decrease in visibility caused by surface reflection is notably observed. Therefore, it is becoming indispensable that antireflection processing is applied to polarizing plates used for liquid crystal panel devices. Polarizing plates with antireflection processing applied thereto is used for most of liquid crystal displays having high operating frequency in outdoors.

Generally in antireflection processing, multi-layer laminated body of two or more thin films comprising materials having different refractive indexes is produced by dry processing methods, such as vacuum deposition method, sputtering method, and CVD method, and thus design is adopted for reducing reflection of visible light region as much as possible. However, in formation of thin film by the above-mentioned dry processing, a vacuum facility is required, consequently leading to very expensive processing costs. Therefore, in recent years, antireflection films are produced to which antireflection processing is performed by formation of antireflection film by a wet coating process. In antireflection films, a constitution comprising, a transparent substrate used as substrate/a resin layer for granting hard coat property/an antireflection layer with low refractive index, is usually adopted. In these antireflection films, in the viewpoint of reflectance, a hard coat layer requires a higher refractive index and an antireflection layer requires a lower refractive index.

As a material having a low refractive index for forming the above described antireflection layer, in the viewpoint of refractive index or stain resistance, polymers containing fluorine etc. are used. Moreover, in general, some approach is performed where porous structures are obtained utilizing a sol-gel reaction of alkoxy silanes or organo alkoxy silanes as material giving a lower refractive index to provide a lower refractive index. However, in the above-mentioned sol-gel reaction, when baking at low temperature is performed in order to control reactivity and to obtain porous structure, long reaction period is inevitably required in curing process, and consequently an antireflection layer having sufficient scratch-proof property cannot be formed in a short period of time. Moreover, film surfaces given by the above-mentioned sol-gel reaction have problems also in stain resistance.

Moreover, in Japanese Patent Laid-open Publication No. H9 (1997)-208898, a proposal using fluorine compounds containing a polysiloxane structure for an antireflection layer is disclosed. In formation of an antireflection layer with the fluorine compounds, uniform reaction is performed, and this method is excellent in stability of liquid, and film uniformity after cured, and good also in stain resistance. However, the fluorine compounds have a little slow curing rate of reaction, and therefore curing requires a long period of time in baking at low temperature. Baking at high temperature is not acceptable, for example, as in a case where triacetyl cellulose film preferably utilized as a protective film of polarizing plate is used as a transparent substrate, and an antireflection layer with the above described fluorine compounds is formed through a hard coat layer thereon. Curing (ageing) time of several days at a temperature of approximately 100 degree C. is required in order to obtain sufficient scratch-proof property.

SUMMARY OF THE INVENTION

The present invention is providing an antireflection film having a hard coat layer-prepared thereto and an antireflection layer with a low refractive index laminated onto a surface of the hard coat layer of a transparent substrate by coating method, wherein an antireflection layer having excellent scratch roof property and stain resistance by curing process performed in a short period of time at comparatively low temperature is formed. It also is providing an optical element in which the antireflection film concerned is prepared. Moreover, it is providing a visual display with the antireflection film concerned or the optical element provided thereto. Furthermore, it is providing an antireflection layer forming agent and an antireflection layer formed by the antireflection layer forming agent concerned.

As a result of whole-hearted examinations made by the present inventors to solve the above described problems, it was found out that the above described objective might be attained using an antireflection film given below, thus leading to completion of the present invention.

That is, the present invention relates to an antireflection film having a hard coat layer prepared on one side of a transparent substrate directly or through other layers, and further an antireflection layer laminated on a surface of the hard coat layer, wherein the antireflection layer is formed by a dry cured film obtained from a solution comprising a siloxane oligomer (A) obtained by condensation polymerization after partial hydrolysis of a hydrolyzable alkoxy silane that contains a tetra alkoxy silane represented by a general formula (1): $Si(OR)_4$ (where R represents methyl group or ethyl group) as a principal component and a compound (B) having a fluoro alkyl structure and a polysiloxane structure.

In the above described antireflection film of the present invention, stain resistance is improved using the above described compound (B), and simultaneously the siloxane oligomer (A) being blended thereto, a slow curing speed of a polysiloxane in the compound (B) having low reactivity is compensated by the reactivity of the siloxane oligomer (A) blended. In this way, when a sol-gel coating material (coating liquid) of a type controlling reactivity in the course of thin film formation is used, an antireflection layer having good scratch-proof property and stain resistance may be formed even in a short curing time at a comparatively low temperature, and, as a result, an antireflection film may be obtained with sufficient productivity.

Moreover, adhesion between the antireflection layer having a low refractive index and the hard coat layer formed in this way improves as compared with an antireflection layer in which the siloxane oligomer (A) or the compound (B) is used independently. Therefore, in reliability test of adhesion etc., peeling will not be observed at an interface between the hard coat layer and the antireflection layer.

In the above described antireflection film, it is preferable that the above described siloxane oligomer (A) is blended, as a dry cured compound in a dry cured film formed as an antireflection layer, so that solid content weight ratio may give 10 to 80 percent by weight in the above described solution for forming the antireflection layer.

The above described siloxane oligomer (A) has high reactivity and when this is independently used for formation of an antireflection layer, an uneven film may easily formed and the film has high density. Therefore, a value of refractive index gives $n_d^{20}$ (refractive index of 20° C.)=1.45 order, then leading to raise of reflectance (dependent on refractive index). Therefore, in formation of the antireflection layer, in viewpoint of balance of reflectance and promotion of curing, it is preferable that the above described mixing ratio of the above described siloxane oligomer (A) is 10 to 80 percent by weight. The above described mixing ratio of the above described siloxane oligomer (A) is more preferably 20 or more percent by weight from a view point of curing promotion. A higher mixing ratio concerned gives formation of a more dense film, and simultaneously a film strength also rises. On the other hand, in the viewpoint of realization of low reflectance, the above described mixing ratio of the above described siloxane oligomer (A) is preferably 80 or less percent by weight, more preferably 50 or less percent by weight, and still more preferably 40 or less percent by weight. In addition, generally in antireflection layer (low refractive index layer), the above described refractive index is preferably about 1.45 or less, and wore preferably 1.41 or less. Moreover, reflectance is preferably about 3 or less percent, and more preferably 2.5 or less percent.

In the above described antireflection film, a hard coat layer is preferably formed of an ultraviolet curable resin, and $n_d^{20}$ (refractive index at 20° C.) is preferably 1.49 or more.

Curing processing with an ultraviolet curable resin is an easy processing operation, and, thereby, a resin coated layer can be efficiently formed in formation of a hard coat layer. Moreover, a refractive index $n_d^{20}$ (refractive index in 20° C.) of this hard coat layer is preferably 1.49 or more, and more preferably 1.52 or more so that while an antireflection layer of low refractive index may keep a low refractive index.

In the above described antireflection film, it is preferable that the surface of the hard coat layer has uneven form, and thus has optical antiglare property. Moreover, in the above described antireflection film, it is preferable for fine particles to be included in the hard coat layer.

When given uneven surface form to the surface, the hard coat layer may demonstrate function as an antiglare property film having also optical diffusion. Moreover, a resin coated layer that has uneven form on the surface is simply and reliably realized using fine particles.

And the present invention relates to an optical element characterized by the above described antireflection film prepared on one side or both sides of an optical element. An antireflection film of the present invention may be used for various kinds of applications, for example, for optical elements. A polarizing plate laminated with the antireflection film of the present invention thereon is excellent not only in antireflection function but in hard coat property, scratch-proof property, and durability, etc.

Furthermore, the present invention relates to the above described antireflection film or a visual display with the above described optical element provided thereto. An antireflection film of the present invention and an optical element are used for various kinds of applications, for example, they are installed on a top face etc. of a visual display.

And the present invention relates to an antireflection film forming agent comprising a solution including a siloxane oligomer (A) obtained by condensation polymerization after partial hydrolysis of a hydrolyzable alkoxy silane that contains, as a principal component, tetra alkoxy silane represented by a general formula (1): $Si(OR)_4$ (where R represents methyl group or ethyl group), and a compound (B) having a fluoro alkyl structure and a polysiloxane structure. And, it is also related to an antireflection film formed by a dry cured film of the antireflection film forming agent concerned.

DETAILED DESCRIPTION OF THE PREFERRED EMBODIMENTS

Figure 1:
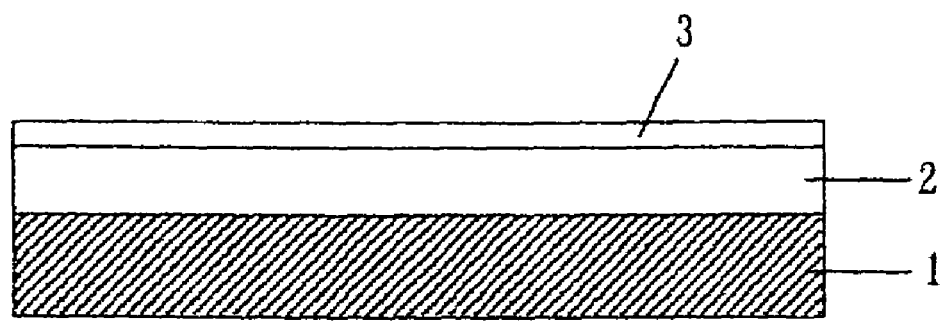
FIG. 1 is an example of a sectional view of an antireflection film of the present invention.
Figure 2:
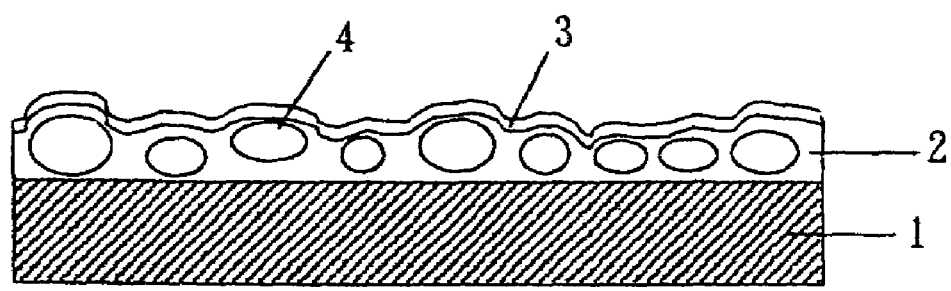
FIG. 2 is an example of a sectional view of an antireflection film of the present invention.

Hereinafter, preferable embodiment of the present invention will be described with reference to accompanying drawings. FIG. 1 is an antireflection film on which an antireflection layer 3 is laminated to a surface of a hard coat layer 2 on a transparent substrate 1. FIG. 2 is an antireflection film in which fine particles 4 is dispersed in a hard coat layer 2 to give uneven form to a surface of the hard coat layer 2. In addition, in FIG. 1 and FIG. 2, although a hard coat layer 2 is directly laminated on a transparent substrate 1, two or more hard coat layers 2 may also be formed, and furthermore, other layers, such as, easily adhesive layer, and conductive layer, may also be additionally formed between them.

A transparent substrate 1 is not especially limited, as long as it excels in light transmission of visible light (90 or more percent of light transmission) and has excellent transparency (1 or less percent of haze values). As materials of the above-mentioned transparent substrate, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming transparent substrate, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; may be mentioned. And the polymer forming transparent substrate, sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Especially in optical property, a film having small birefringence is suitably used. For a protective film of a polarizing plate, triacetyl cellulose, polycarbonates, acrylic based polymers, cyclo-olefin based resins, polyolefins having norbornene structure, etc. are suitable. The present invention is suitable when a transparent substrate having difficulties in baking at a high temperature like triacetyl cellulose is used. In addition, in triacetyl cellulose, plasticizers in film volatilize and physical properties fall markedly under temperature conditions of 130° C. or more.

A thickness of a transparent substrate 1 is determined appropriately, and in general, it is approximately 10 to 500 μm so that it may have suitable thinness, or in viewpoint of workability, such as strength and handling property. Especially it is preferably 20 to 300 μm, and more preferably 30 to 200 μm.

As long as it has an excellent hard coat property, demonstrates a sufficient strength after formation of film layer, and has outstanding light transmission, a hard coat layer 2 will not especially be limited. Resins of thermosetting type, resins of thermoplastic type, resins of ultraviolet curable type, resins of electron beam curable type, resins of two components mixing type, etc. may be mentioned as resins for forming the hard coat layer 2 concerned. And among them, a resin of ultraviolet curable type that may form a hard coat layer efficiently through easy processing operation by curing processing with UV irradiation is suitable.

Among examples of resins of ultraviolet curable type are various kinds of resin, such as polyester based, acrylic based, urethane based, amide based, silicone based, and epoxy based resins, and ultraviolet rays curing type monomers, oligomers, and polymers etc. are also included. As a resin of ultraviolet curable type used preferably, for example, a resin that has functional groups with ultraviolet rays polymerizable property and a resin that includes, as a component, acrylic based monomers and oligomers having 2 or more, especially 3 to 6 of functional groups concerned may be mentioned. And, ultraviolet rays polymerization initiator is blended in resins of ultraviolet curable type.

Minute uneven structures may be given to a surface of a hard coat layer 2 to demonstrate antiglare property. A method of forming minute uneven structure on a surface is not especially limited, but any suitable method may be adopted. For example, a method of forming minute uneven structure on a surface of a material itself that forms the hard coat layer 2 may be mentioned. As illustrative examples, a method may be mentioned in which rough surfacing processing is beforehand given to the surface of the film used for formation of the above described hard coat layer 2 by proper manners, such as sandblasting, roll embossing, and chemical etching to give minute uneven structure to the film surface. And, a method may also be mentioned in which additional coating of another hard coat layer 2 is separately given on the hard coat layer 2, and minute uneven structure is given by a transfer method with metal mold etc. onto the resin coated layer surface concerned. Furthermore, as shown in FIG. 2, minute uneven structure is given by dispersing fine particles 4 in the hard coat layer 2 may be mentioned. In the formation method of these minute uneven structures, two or more kinds of methods may be used in combination, and a layer may be formed in which different type of minute uneven structures are compounded on the surface. In the formation method of the above described hard coat layer 2, a method of forming a hard coat layer 2 that contains the fine particles 4 dispersed therein is preferable in view of easiness and reliability of formation of minute uneven structure.

Hereinafter, a method will be described in which fine particles 4 are included in a dispersed state to prepare a hard coat layer 2. As fine particles 4, material having transparency, such as various metal oxide, glass, and plastic, may be used especially without any limitation. For example, among used these examples are, inorganic oxide fine particles, such as silica, alumina, titania, zirconium oxide, calcium oxide, tin oxide, indium oxide, and antimony oxide; cross-linked or linear organic fine particles comprising various polymers, such as polymethylmethacrylates, polystyrenes, polyurethanes, acryl-styrene copolymers, benzoguanamine, melamines, and polycarbonates; and silicone based fine particles, etc. In addition, these are not limited in shape but may have beads-like globular form or they may have powdered unfixed shape. These fine particles 4 may be used independently or, two or more kinds may be selected and used in combination. Mean particle diameter of the fine particles is 1 to 10 μm, and preferably 2 to 5 μm. And, in order to control refractive index and to give electric conductivity, ultrafine particles of metal oxides etc. may be dispersed or impregnated in the fine particles. Percentage of fine particles 4 is suitably determined in consideration of mean particle diameter of the fine particles 4, and a thickness of the hard coat layer, etc. In general, it is preferable to be 1 to 20 parts by weight grade, and is more preferable to be 5 to 15 parts by weight to resin 100 parts by weight.

In the above described resin of ultraviolet curable type (formation of hard coat layer 2), additives, such as leveling agents, thixotropy agents, and antistatic agents may be used. Use of thixotropy agent is advantageous in formation of projecting particles on a minute uneven structure surface. As thixotropy agents, silica, mica, smectite, etc. having particle diameter of 0.1 or less μm may be mentioned.

Formation method of a hard coat layer 2 is not especially limited, but any proper method may be adopted. For example, on the above described transparent substrate 1, a resin (fine particles 4 is suitably included) is coated, and curing processing is carried out after dried. When a hard coat layer 2 includes fine particles 4, this processing forms the hard coat layer 2 giving uneven shape on the surface. Coating of the above described resin is carried out by proper methods, such as fountain, die coater, casting, spin coat, fountain metalling, and photogravure etc. In addition, in coating processing, the above described resins may be diluted with usual solvents, such as toluene, ethyl acetate, butyl acetate, methyl ethyl ketone, methyl isobutyl ketone, isopropyl alcohol, and ethyl alcohol, and they may also be coated without dilution. And, a thickness of the hard coat layer 2 is not especially limited, but it is preferably approximately 0.5 to 20 μm, and more preferably 1 to 10 μm.

An antireflection layer 3 is laminated onto the surface of the hard coat layer 2. An antireflection layer forming agent includes a siloxane oligomer (A) obtained by condensation polymerization after partial hydrolysis of a hydrolyzable alkoxy silane that contains a tetra alkoxy silane represented by a general formula (1): $Si(OR)_4$ (where R represents methyl group or ethyl group) as a principal component, and a compound (B) having a fluoro alkyl structure and a polysiloxane structure, and usually, these are blended at the above described predetermined percentage.

The siloxane oligomer (A) is obtained by following method; hydrolyzable alkoxy silane is introduced into a large amount of alcoholic solvent (for example, methanol, and ethanol etc.) and reacted for several hours at room temperature under existence of water and acidic catalyst (hydrochloric acid and nitric acid etc.), partially hydrolyzed, and then condensation polymerization is carried out. A relative molecular weight converted by ethylene glycol/polyethylene oxide of the siloxane oligomer (A) by a GPC method is preferably in a range of 900 to 1000. The relative molecular weight of the above described siloxane oligomer (A) is controllable by addition of hydrolyzable alkoxy silane and water.

The hydrolyzable alkoxy silane has tetra alkoxy silane represented by a general formula (1): $Si(OR)_4$ (where R represents methyl group or ethyl group) as a principal component. Among these tetra alkoxy silanes are tetra methoxy silane and/or tetra ethoxy silane, and they are usually preferably 80 or more mol percent in the hydrolyzable alkoxy silane.

Among hydrolyzable alkoxy silanes used in addition to the above described tetra alkoxy silanes are tetra alkoxy silanes, such as tetra propoxy silane and tetra butoxy silane; methyl tri methoxy silane, methyl tri ethoxy silane, ethyl tri methoxy silane, ethyl tri ethoxy silane, propyl tri methoxy silane, propyl tri ethoxy silane, butyl tri methoxy silane, butyl tri ethoxy silane, pentyl tri methoxy silane, pentyl tri ethoxy silane, heptyl tri methoxy silane, heptyl tri ethoxy silane, octyl tri methoxy silane, octyl tri ethoxy silane, dodecyl tri methoxy silane, dodecyl tri ethoxy silane, hexadecyl tri methoxy silane, hexa decyl tri ethoxy silane, octa decyl tri methoxy silane, octa decyl tri ethoxy silane, phenyl tri methoxy silane, phenyl tri ethoxy silane, vinyl tri methoxy silane, vinyl tri ethoxy silane, γ-amino propyl tri methoxy silane, γ-amino propyl tri ethoxy silane, γ-glycidoxy propyl tri methoxy silane, γ-glycidoxy propyl tri ethoxy silane, γ-methacryloxy propyl tri methoxy silane, γ-methacryloxy propyl tri methoxy silane, dimethyl dimethoxy silane, dimethyl diethoxy silane, etc.

Compound (B) having a fluoro alkyl structure and a polysiloxane structure is obtained by following method; for example, perfluoro alkyl alkoxy silane having alkoxy silyl group that may be condensable by sol-gel reaction and hydrolyzable alkoxy silane having tetra alkoxy silane represented by a general formula (2): $Si(OR^1)_4$ (where $R^1$ represents alkyl group of carbon numbers 1 to 5) as a principal component are heated to be polymerized by condensation under existence of organic acids (for example, oxalic acid etc.) and esters in alcoholic solvents (for example, methanol, ethanol, etc.) Thus polysiloxane structure is introduced into the obtained compound (B).

In addition, a ratio of these reaction components is not especially limited, but usually, the hydrolyzable alkoxy silanes is preferably approximately 1 to 100 mols to one mol of the perfluoro alkyl alkoxy silanes, and more preferably 2 to 10 mols.

As perfluoro alkyl alkoxy silane, a compound represented by a general formula (3): $CF_3(CF_2)_nCH_2CH_2Si(OR^2)_3$ (where, $R^2$ represents an alkyl group of carbon numbers of 1 to 5 and n represents an integer of 0 to 12) may be mentioned. Specifically, trifluoro propyl tri methoxy silane, trifluoro propyl tri ethoxy silane, tri deca fluoro octyl tri methoxy silane, tri deca fluoro octyl tri ethoxy silane, hepta deca fluoro decyl tri methoxy silane, hepta deca fluoro decyl tri ethoxy silane, etc. may be mentioned. Among them, a compound in which the above described n is 2 to 6 is preferable.

As tetra alkoxy silanes represented by a general formula (2): $Si(OR^1)_4$ (where $R^1$ represents an alkyl group of carbon numbers of 1 to 5), tetra methoxy silane, tetra ethoxy silane, tetra propoxy silane, tetra butoxy silane, etc. may be mentioned. Among them tetra methoxy silane, tetra ethoxy silane, etc. are preferable. In addition, in preparation of the compound (B), content of tetra alkoxy silane exemplified by the above described general formula (2) is usually set 80 or more mol percent, and the above described hydrolyzable alkoxy silanes not represented by (2) may be used as a remaining component.

An antireflection layer forming agent including the above described siloxane oligomer (A) and compound (B) having a fluoro alkyl structure and a polysiloxane structure is prepared as a solution blended so that the above described percentage might preferably be given. In the viewpoint of stability of solution, these are preferably blended immediately before coating.

Moreover, a sol in which silica, alumina, titania, zirconia, and magnesium fluoride, ceria, etc. are dispersed in alcoholic solvent may be added in the antireflection layer forming agent. In addition, additives, such as metal salts and metal compounds may be suitably blended.

The antireflection layer forming agent (solution) is coated to the above described hard coat layer 2, dried and cured to form an antireflection layer 3. In formation of the antireflection layer 3, curing of the siloxane oligomer (A) and thepolysiloxane of compound (B) progresses with volatilization of solvent, and coated layer is formed. A coating method of the above described antireflection layer forming agent is not especially limited, and usual methods, for example, dipping method, spin coat method, brush painting method, roll coating method, flexographic printing method, etc. may be mentioned.

Although drying and curing temperature is not especially limited, the drying and curing may be performed at a low temperature of 60 to 150° C. and further 70 to 120° C., in a short time of 100 or less hours and further 0.5 to 10 hours. In addition, temperature and time are not limited to the above described range, but may be adjusted suitably. As for heating methods, methods of hot plate, oven, belt furnace, etc. may be suitably adopted.

Although a thickness of the antireflection layer is not especially limited, it is preferably to be approximately 0.05 to 0.3 μm, and more preferably 0.1 to 0.3 μm. It is preferable in the viewpoint of reflectance reduction that a value of thickness (nm)×refractive index may usually give approximately 140 nm.

Moreover, optical elements may be adhered to the above described transparent substrate 1 of the antireflection film in FIG. 1 or 2 (not shown).

As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl, alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent substrate in the above described illustration may be used. As the above described transparent protective film, a transparent protective film whose both sides, surface side and backside, are formed from same polymer material may be used, and also a transparent protective film whose both sides are formed by different polymer materials etc. may be used. When the above described antireflection film is provided onto one side or both sides of a polarizer (a polarizing plate), a transparent substrate of the antireflection film may also serve as a transparent protective film of the polarizer.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes, circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamnides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The. polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and-increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported,(PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate maybe a reflection type elliptically polarizing plate or a semi-transmission type elliptically polarizing plate, etc. in which the above-mentioned reflection type polarizing plate or a transflective type polarizing plate is combined with above described retardation plate respectively.

Although a laminating of the above described antireflection film to the optical element and of the various optical layer to the polarizing plate may be formed by a method in which laminating seperately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for, laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the antireflection film, while a layer not prepared the antireflection film an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element prepared with the antireflection film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Although illustrative description of the present invention will be hereinafter given with reference to Examples, the present invention is not limited at all by these Examples.

Example 1

Preparation of an Antireflection Layer Forming Agent

Tetra methoxy silane 30 g and methanol 240 g were introduced into 4-necked flask, and a mixture was agitated while a liquid temperature being kept at 30° C. Subsequently, aqueous solution in which nitric acid 2 g was blended with water 6 g-was added to the mixture, and agitated at 30° C. for 5 hours to obtain alcoholic solution (solution A) of siloxane oligomer. A relative molecular weight converted by ethylene glycol/polyethylene oxide of the siloxane oligomer by a GPC method gave 950.

Separately, after methanol 300 g was introduced into 4-necked flask, while oxalic acid 30 g was mixed while agitated. While this solution was heated and refluxed, tetra methoxy silane 30 g and tri deca fluoro octyl tri methoxy silane 8 g were dropped into the mixture, and subsequently heated under 5-hour refluxing. Subsequently, mixture was cooled and a solution (solution B) of fluorine compound having a fluoro alkyl structure and a polysiloxane structure was obtained.

The solution A 30 g and the solution B 100 g were mixed under agitation, and diluted with butyl acetate to obtain an antireflection layer forming agent (coating liquid), in which a solid content weight ratio might give 1 percent by weight in the mixture coating liquid.

Production of an Antireflection Film

A toluene solution of a commercially available ultraviolet rays curing acrylic based hard coat resin was applied on a triacetyl cellulose film using a wire bar. Subsequently, after solvent was dried, ultraviolet rays were irradiated with a low voltage UV lamp, and a hard coat layer having a thickness of 5 μm was formed. A refractive index of the resin forming the hard coat layer gave 1.52.

Then, the coating liquid prepared as mentioned above was applied using a wire bar so that a thickness after cured might gave approximately 100 nm. Subsequently, the applied film was heated at 90° C. for 1 hour, and was cured to form an antireflection layer, and thus an antireflection film was obtained. A refractive index of the antireflection layer showed 1.40. Moreover, a solid content weight ratio of the siloxane oligomer of the antireflection layer showed approximately 30 percent by weight as dry cured compound.

Example 2

Except for having used a toluene solution in which silica beads having a particle diameter of 2 micrometer 5 parts by weight was added to a solid content of the resin 100 parts by weight in (production of antireflection film) of Example 1 when forming hard coat layer, same procedure as in Example 1 was repeated to form a hard coat layer with antiglare function. And, an antireflection film was produced as in Example 1.

Example 3

Except the solution A 70 g and the solution B 30 g being agitated and mixed, in which a solid content weight ratio might give 1 percent by weight in the mixture coating liquid, in (preparation of an antireflection layer forming agent) of Example 1, same procedure as in Example 1 was repeated to obtain an antireflection layer forming agent (coating liquid). And except having used the antireflection layer forming agent concerned, same procedure as (production of antireflection film) of Example 1 was repeated to produce an antireflection film. A refractive index of the antireflection layer showed 1.42. Moreover, a solid content weight ratio of the siloxane oligomer of the antireflection layer showed approximately 70 percent by weight as dry cured compound.

Comparative Example 1

In (production of an antireflection film) of Example 1, except having used only the solution B as a coating liquid, same procedure as in Example 1 was repeated to obtain an antireflection film. A refractive index of the antireflection layer showed 1.39.

Comparative Example 2

In (production of an antireflection film) of Example 1, except having used only the solution A as a coating liquid, same procedure as in Example 1 was repeated to obtain an antireflection film. A refractive index of the antireflection layer showed 1.45.

The antireflection films obtained in Examples and Comparative Examples were evaluated for following properties. Results are shown in Table 1.

Steel Wool Test

A surface of an antireflection film (antireflection layer) was rubbed 10 times by steel wool of #0000 in a state of a load of 0.05 MPa applied thereon, and a degree of scratched damage after rubbing was visually judged based on a following criteria.
O: Scratched damage was not recognized.
X: Scratched damage was recognized.

Reflectance

A backside (a side on which an antireflection layer is not formed) of an antireflection film was rubbed with sandpaper, and rough surface was formed. Black lacquer was applied to this face to inhibit reflection of the backside. This sample was evaluated for total reflectance (%) using a spectrophotometer with inclined integrating sphere (manufactured by Shimadzu Corporation, UV-2400).

Fingerprint Wiping Performance

Wiping performance by-tissue paper for sebum compulsorily put on a surface of a sample used for reflectance measurement was visually judged based on a following criteria.
0: Wiping residue was not recognized after wiping of fingerprint.
X: Fingerprint could not be wiped off or wiping residue was recognized.

Adhesion

According to grid pattern tape friction test given in JIS K-5400, adhesion between a hard coat layer and an antireflection layer was evaluated. Results were represented by peeled number/100.

TABLE 1

| | Steel wool test | Reflectance (%) | Wiping performance | Adhesion |
|---|---|---|---|---|
| Example 1 | ○ | 2.0 | ○ | 0/100 |
| Example 2 | ○ | 2.1 | ○ | 0/100 |
| Example 3 | ○ | 2.4 | ○ | 0/100 |
| Comparative Example 1 | × | 1.9 | ○ | 0/100 |
| Comparative Example 2 | ○ | 3.0 | × | 0/100 |

As shown in the above described result, in antireflection films in Examples, antireflection layer excellent in scratch-proof property and stain resistance is formed by curing in comparatively short period of time and at low temperature of 1 hour and at 90 degree C., and this antireflection film is excellent in antireflection property and practical use.

And, when antireflection films in Examples 1 to 3 were used as a protective layer (protective film) of a polarizing plate, the above described properties were maintained to obtain a polarizing plate with antireflection function having high practicality.

What is claimed is:

1. An antireflection film having a hard coat layer prepared on one side of a transparent substrate directly or through other layers, and further an antireflection layer laminated on a surface of the hard coat layer,
    wherein the hard coat layer is formed of an ultraviolet curable resin and has a $n_d^{20}$ (refractive index at 20° C.) which is 1.49 or more,
    wherein the antireflection layer is formed by a dry cured film obtained from a solution comprising
    a siloxane oligomer (A) obtained by condensation polymerization after partial hydrolysis of a hydrolyzable alkoxy silane that contains a tetra alkoxy silane represented by a general formula (1): $Si(OR)_4$ (where R represents methyl group or ethyl group) as a principal component
    and a compound (B) having a fluoro alkyl structure and a polysiloxane structure obtained by polymerization of a compound having a perfluoro alkyl structure and a hydrolyzable non-fluorinated alkoxy silane.

2. The antireflection film according to claim 1, wherein the siloxane oligomer (A) is blended in the solution so that a solid content weight ratio of the siloxane oligomer (A) in the antireflection layer is 10 to 80 percent by weight.

3. The antireflection film according to claim 1, wherein a surface of a hard coat layer has uneven form and has optical antiglare property.

4. The antireflection film according to claim 1, wherein the hard coat layer comprises fine particles.

5. An optical element having an antireflection film according to claim 1 provided on one side or on both sides of the optical element.

6. An optical element having an antireflection film according to claim 2 provided on one side or on both sides of the optical element.

7. An optical element having an antireflection film according to claim 3 provided on one side or on both sides of the optical element.

8. An optical element having an antireflection film according to claim 4 provided on one side or on both sides of the optical element.

9. A visual display provided with the antireflection film according to claim 1.

10. A visual display provided with the antireflection film according to claim 2.

11. A visual display provided with the antireflection film according to claim 3.

12. A visual display provided with the antireflection film according to claim 4.

13. A visual display provided with the optical element according to claim 5.

14. A visual display provided with the optical element according to claim 6.

15. A visual display provided with the optical element according to claim 7.

16. A visual display provided with the optical element according to claim 8.

17. The antireflection film according to claim 1, wherein in the preparation of compound (B), the hydrolyzable non-fluorinated alkoxy silane is represented by the formula (1): $Si(OR)_4$, where R represents methyl group or ethyl group.

18. The antireflection film according to claim 1, wherein the hydrolyzable alkoxy silane is present in a ratio of about 1 to 100 mols to one mol of the compound having a perfluoro alkyl structure.

19. The antireflection film according to claim 17, wherein the hydrolyzable alkoxy silane is present in a ratio of about 1 to 100 mols to one mol of the compound having a perfluoro alkyl structure.

20. The antireflection film according to claim 19, wherein the hydrolyzable alkoxy silane is present in a ratio of about 2 to 100 mols to one mol of the compound having a perfluoro alkyl structure.

21. The antireflection film according to claim 19, wherein the hydrolyzable alkoxy silane is present in a ratio of about 2 to 100 mols to one mol of the compound having a perfluoro alkyl structure.

22. A visual display provided with the antireflection film according to claim 17.

* * * * *